United States Patent
Engdahl

[15] 3,683,397
[45] Aug. 8, 1972

[54] INSTRUMENT AND METHOD FOR RECORDING MECHANICAL TRANSIENTS

[72] Inventor: Paul D. Engdahl, 2850 Monterey Ave., Costa Mesa, Calif. 92626

[22] Filed: Aug. 14, 1970

[21] Appl. No.: 63,752

[52] U.S. Cl. ..........................346/1, 73/70.2, 346/7, 346/77, 346/135
[51] Int. Cl. ...............................................G01d 9/02
[58] Field of Search........346/7, 77, 111, 134, 135, 1; 73/489, 70.2, 71, 67.2, 67.1, 67

[56] References Cited

UNITED STATES PATENTS

| | | | |
|---|---|---|---|
| 2,906,117 | 9/1959 | Kennard | 73/70.2 |
| 3,092,434 | 6/1963 | Uinet | 346/107 |
| 3,445,857 | 5/1969 | Pope | 346/7 |
| 3,479,036 | 11/1969 | Carroll et al | 274/4 |

*Primary Examiner*—Joseph W. Hartary
*Attorney*—Lawrence Fleming

[57] ABSTRACT

A recording accelerometer of the general type known as a read gage and a related method, such as is used in recording mechanical shocks in ballistics and impact studies. Inertial cantilever reeds of known natural frequency each carry round-pointed styli, arranged to scratch or emboss line-like marks on smooth, relatively soft recording surfaces. The shape and pressure of the stylus tips is such that they produce some plastic displacement of the recording surfaces. It is found that the limits of the vibratory excursions of each reed are visible under a microscope, marking the peaks of each half-cycle of such oscillations. Since these peaks occur at known time intervals (the natural frequencies being known), time information is obtained from the record in addition to the usual displacement information. Thus the entire decaying oscillatory waveform executed by each reed can be recovered from the "scratch" records, even though the recording medium does not move to provide a time base in the usual sense. From this waveform, a curve of force or acceleration vs. time, or shock signature, can be plotted.

4 Claims, 10 Drawing Figures

PATENTED AUG 8 1972

INVENTOR.
PAUL D. ENGDAHL,
By Lawrence Fleming
AGENT.

PATENTED AUG 8 1972 3,683,397

INVENTOR.
PAUL D. ENGDAHL,
By Lawrence Fleming
AGENT.

INSTRUMENT AND METHOD FOR RECORDING MECHANICAL TRANSIENTS

BACKGROUND OF THE INVENTION

In engineering studies of transient mechanical phenomena such as impacts and explosions, it is common practice to record the acceleration experienced at some location on a moving object or on a target. In research work, recordings are made of other transient mechanical forces, such as may be derived from the air blast of an explosion or from the magnetic field produced by a pulse of electric current, e.g., a lighting stroke.

Such data are often recorded by means of mechanoelectric transducers such as pressure pickups or accelerometers, plus wire or radio telemetry and tape recorders or oscillographs. On certain occasions, however, such instrumentation is not suitable, as where adequate space and electric power are not available, or where extreme ruggedness or reliability are required, or the time of occurrence of the phenomenon is not predictable and may be some weeks or months after the instrumentation is installed. For such occasions, simpler, self-contained instruments are used, of types which require no electric power. They are also used as backup instruments in, for example, missile testing, in case of failure of the more elaborate instrumentation.

The present invention relates to simple, self-contained instruments of this class. One such instrument is generally known as an impact accelerometer or reed gage. Its main components are a mechanical mass-spring system having substantially a single degree of freedom, or resonant mass-spring system, together with a stylus attached thereto, and a recording surface. This surface may be a thin plating of gold on a steel backing. When the instrument as a whole is accelerated by an external mechanical shock, the recording surface moves with respect to the stylus, and the peak acceleration is recorded as a scratch on the recording surface. The displacements are usually small in practice, and the scratch amplitude is measured under a microscope. The natural or resonant frequency of the resonant mass-spring system being known, the displacement per unit acceleration is also known. Several such resonant systems, usually in the form of reeds, are often used in one instrument.

Prior instruments of this general class are of two types. The first has a stationary recording surface, so that when the stylus moves back and forth, it retraces substantially the same path. In such prior art instruments, only the maximum excursions of the stylus can be read from the record. The second prior type uses a recording surface in the form of a disc, drum, or tape, which is moved by motor means to provide a time base. Here, the whole waveform executed by the stylus is recorded, usually in the form of a decaying oscillation; and from it the time history of the acceleration force (or other mechanical force being recorded) can be recovered. Such a time history of acceleration is sometimes called a shock signature. It is much more valuable than a mere record of the peak acceleration value. For example, a body accelerated at a rate of 1,000 g for 1 millisecond will travel about 0.2 inches, and such a deflection might be absorbed elastically by a structure; but if this acceleration lasts for 10 milliseconds, the distance is about 20 inches.

The instrument of this invention uses no motor means to provide a time base, but does provide a novel way for the recovery of the acceleration vs. time curve or shock signature.

BRIEF SUMMARY OF THE INVENTION

A preferred form of the present invention comprises a number of resonant mass-spring system or "passive mechanical oscillators" in the form of resonant reeds of different natural frequencies, each tipped with a stylus and disposed so that the stylus is pressed against a soft smooth metal surface, and will scratch or emboss the surface in proportion to the deflection of its reed. The styli have hard, smooth, rounded tips and are preferably of diamond. The tip radius is preferably somewhat less than that of a phonograph pickup stylus. The recording surface may be a bright gold flash of the order of 30 microinches thick plated over a polished substrate of stainless steel or the like, followed by a flash of gold plated at a faster than normal rate to provide a relatively coarse brownish deposit. The latter type of flash or plating is known as smut gold.

With such a structure, the stylus produces an appreciable plastic deformation of the gold surface in its path, throwing up small ridges on either side, and pushing away and piling up material at the ends of each of its strokes. The action is somewhat like that found in the dry point process in fine arts. There appears to be no established term that defines the action exactly. Hence the term "embossing" is used here in reference to it. The word is used in approximately the sense in which it was formerly applied in sound recording. An illustration of such usage is found in the book "The Recording and Reproduction of Sound" by Oliver Read, published by Howard W. Sams & Company, 1952 (page 21).

The piling up of gold at the ends of the vibratory excursions of the stylus, during this embossing process, provides peak-amplitude marks for each half-cycle which are visible under a microscope. By measuring and plotting the locations of each such mark, the peaks of each of the several or many excursions of the stylus may be connected on paper, to give the envelope of the decaying mechanical oscillations. The medians of these excursions may then be plotted and then connected by a drawn line. These median points are points defining the acceleration vs. time history of the stylus, i.e., the shock signature. The time scale is known because the time between successive peaks is known: half the natural period of the passive mechanical oscillator or reed. Thus the desired time-base data is recovered from a simple instrument having a stationary recording medium.

The same principle may be applied to any means of recording wherein the ends of the successive vibratory excursions of the stylus, or other marking device, can be detected. Embodiments of the invention are shown herein which use magnetic recording and photographic recording.

SHORT DESCRIPTION OF DRAWING

DETAILED DESCRIPTION

Figure 1:
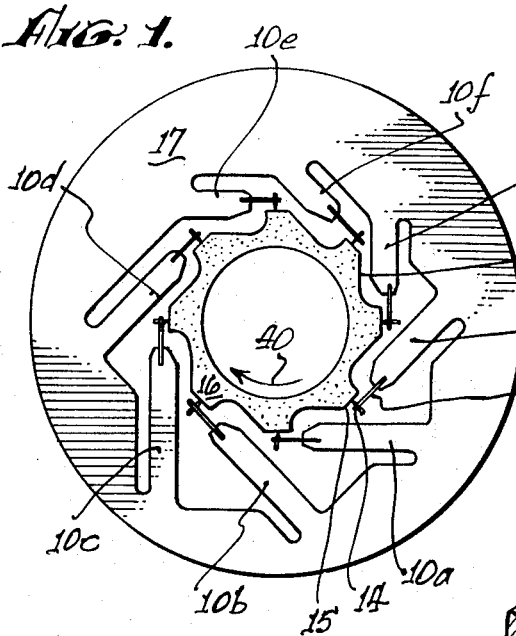
FIG. 1 is a simplified top view, with the cover removed, of an eight-reed recording accelerometer or reed gage according to the invention.

In the simplified top view of a recording accelerometer, FIG. 1, a series of eight reeds is shown, 10 – 10g. At the tip of each reed is a stylus carrier 12, to the end portion of which is attached a stylus 14. The tip of each stylus bears upon one of the recording surfaces 15 of a hub 16. Eight surfaces such as 15 are shown in FIG. 1, each preferably with a soft coating such as a thin plating or flash of smut gold (described above) over a flash of bright soft gold.

In FIG. 1, the reeds 10 – 10g may each have a different natural frequency, and hence a different deflection sensitivity, so that usable records can be obtained over a wide range of accelerations, and data obtained for a shock spectrum (defined in the literature). Each reed may be a portion of a single piece of sheet spring material 17, which may be machined, stamped, or etched to the required shape. The center hub 16, which carries the records, is removable.

When the hub 16, FIG. 1, is installed in the instrument case, it is lowered into place with the recording surfaces such as 15 opposite the stylus carriers 12; then it is rotated through a small angle (indicated by arrow 40) so that the styli are approximately centered on the recording surfaces 15. During this rotation, each stylus makes a horizontal scratch, which provides a zero reference line for the subsequent record. Such a scratch is shown at 43 in FIGS. 2 and 4. When the hub is removed from the instrument, it is again rotated in the same sense until the styli 14 are opposite the depressed areas such as 27, and then lifted out of the instrument. During these rotations, the styli leave scratches such as indicated at 41, FIGS. 2 and 4. Both these scratches normally line up. If they do not, it is an indication that the zero position of the reed has shifted during use, as by overstressing.

Figure 2:
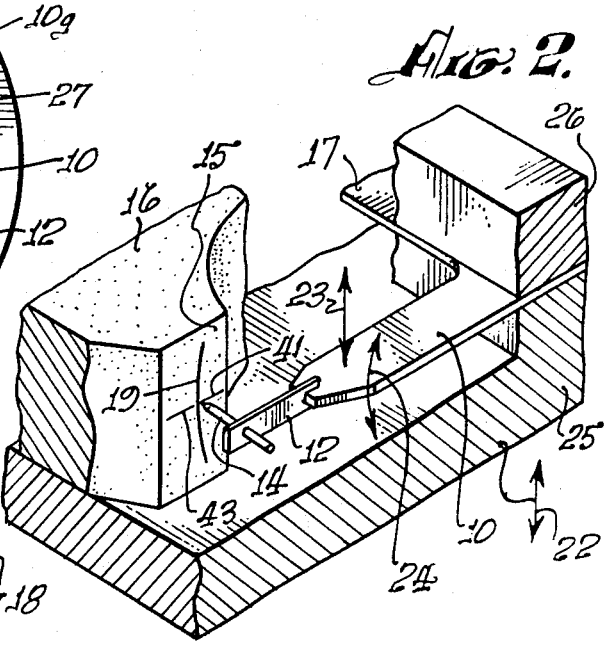
FIG. 2 is a cutaway enlarged perspective view of one of the reeds, styli, and recording surfaces of the instrument of FIG. 1.

FIG. 2 shows the structure associated with one of the reeds 10 to a larger scale and in more detail. When the whole instrument is subjected to an acceleration having a component in the direction of the arrow 22, an inertial force, indicated by arrow 23, will act to bend the reed 10 as indicated by arrow 24. Stylus carrier 12, attached to the tip portion of reed 10, acts as a spring to press the stylus 14 against the recording surface 15. It is made much stiffer in the direction of arrow 24 than in the direction of the axis of the stylus 14. When the stylus carrier moves with respect to the recording surface 15, the stylus 14 "scratches" or embosses a record mark 19 thereon.

The base portion of reed 10, which is part of the spring sheet 17, may be clamped between the adjacent portion of the frame 25 and a clamping member 26, as shown in FIG. 2. Centerpiece or hub 16, a portion of which is shown in FIG. 2, is removably attached to frame 25.

Figure 3:
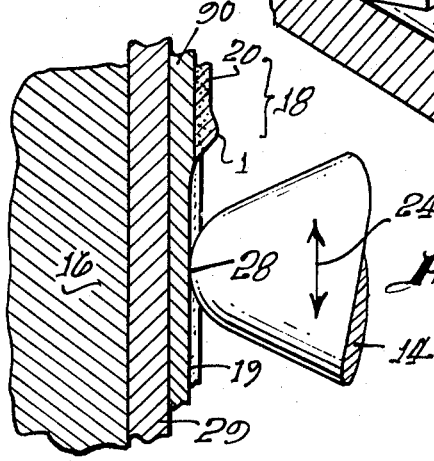
FIG. 3 is a greatly enlarged diagrammatic sectional view illustrating the embossing action of a stylus.

Proceeding now to FIG. 3, a greatly enlarged sectional view illustrates the general nature of the marking process. The stylus 14 may be of diamond, with a spherical tip 28 of the order of 0.0008 inch radius. The recording surface 18 may comprise a thin layer of smut gold 20 over a gold flash 90. Underlying this may be a layer of plated nickel 29 on the substrate 16, which may be of stainless steel or other suitable structural material. When the stylus 14 moves, its tip portion 28 digs or embosses a groove 19 in the recording surface. At the end of a stroke, the gold 90, 20 is pushed or piled up into a ridge 1. Such a ridge is visible under a microscope, and marks the end or peak of an oscillation or stroke.

It will be understood that in practical instruments of this nature, the dimensions of the record are small. The mark such as 19 may be 0.1 inch long and about 0.001 inch wide. It is usually read with a microscope of 100–400 power with a micrometer stage. The ridges or end marks such as 1 appear as dark cross-bars at a magnification of 100X. At 400X they look like lumpy piles of material resembling slightly a heap of soil left behind by a retreating bulldozer blade. Sectioning of such records for microphotography is difficult. The microphotographs from which the above description was made were taken as vertical views of the record.

While I have indicated stylus and recording surface dimensions and materials specifically, it is understood that any kind of stylus or marking element, and any record surface, which will render visible or detectable the peaks of the cyclic linear excursions of the stylus fall within the purview of the invention. For example, sapphire or steel styli with recording surfaces of suitable plastics may be used. Magnetic and photographic recording means are described later.

Figure 4:
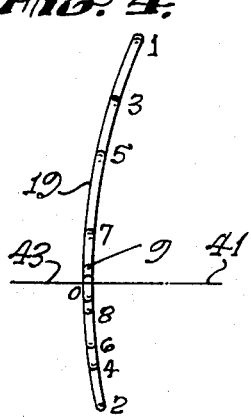
FIG. 4 is a greatly enlarged diagrammatic illustration of a record mark such as may be made by the stylus of FIG. 2.

FIG. 4 shows diagrammatically the nature of a "scratch" or embossed record according to the invention. The broadly curved double line 19 indicates the boundaries of the record mark, and corresponds to a diagrammatic enlarged view of the mark 19 in FIG. 2. As the reed 10, FIG. 2, is excited into oscillation at its natural frequency by a sudden acceleration or deceleration, its oscillations decay, damped by the coulomb friction presented to the stylus. An initial excursion of the stylus ends or peaks, in FIG. 4, at 1. The next swing ends at 2, and the next half-cycle of oscillation at 3, the following half-cycle peak at 4, and so on until the amplitude becomes relatively small at 9. The asymmetrical distribution of these peaks about the zero axis indicates that a driving force (in this case, an acceleration) was present, and changing relatively slowly with respect to the natural period of the reed 10. The time interval Δt between peak marks 1, 2, 3, 4, etc. is obviously equal to half the natural period of oscillation of the reed 10.

Figure 5:
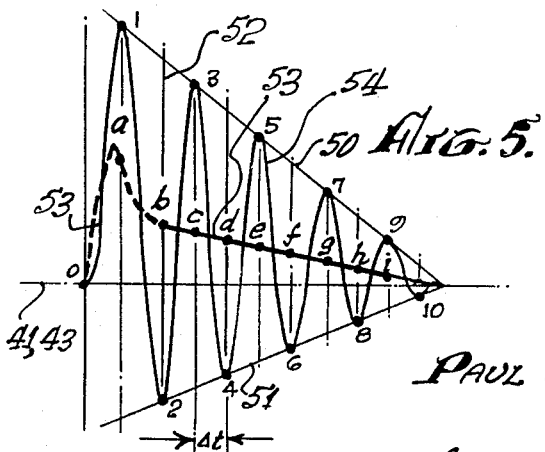
FIG. 5 is a plotted curve of the data recoverable from the record of FIG. 4.

FIG. 5 shows a graphic plot of the amplitude and time information obtained from FIG. 4 and from knowing the natural frequency of the reed 10. Point 1 is plotted at a positive X-displacement analogous to the amplitude of point 1 in FIG. 4, point 2 analogous to 2, and so on, at time intervals Δt equal to half the natural period of oscillation of the reed.

These points 1, 2, 3 .... 9 may be connected by a line 54 in the shape of a decaying sinusoid, to depict the actual waveform of the motion of the stylus, as shown in FIG. 5. This, however, is useful primarily for illustrative purposes. To reconstruct the acceleration vs. time curve or shock signature, from the plot of points 1–9, it is preferable to draw a line 50 through all the upper points 1, 3, 5, ... and a line 51 through all the lower points 2, 4, 6, ... While lines 50, 51 are shown as substantially straight in FIG. 5, they may obviously take whatever shapes are dictated by the points 1–9, such as exponential curves. These lines 50, 51 define the excursion envelope of the record.

The shock signature may now be plotted from the excursion envelope, as its median. From each point 1–9 a vertical line may be drawn, to intersect the opposite side of the excursion envelope, and the midpoint of that line plotted as a point on the shock signature. For example, vertical 52 extends from point 2 across the excursion envelope, between lines 51 and 50. The midpoint of line 52 is plotted as point b. Similarly, a vertical from point 3 to line 51 provides point c at its middle, and so on, the shock signature being shown as the heavy line in FIG. 5 connecting points b – i.

The portion of the shock signature between the starting point 0 (on base line 43, 41) and point b, opposite the second excursion peak 2, is shown dotted, because it is not always determined in as simple a manner as the subsequent points. If the applied shock acceleration rises rapidly in comparison to the half-period of oscillation of the reed, Δt, the initial portion of the record 0–b may be of a more complex nature than the example shown in FIG. 5, and require more complex methods for its reduction. Such methods do not form a part of the invention.

It will be seen that the excursion envelope has been determined by the positions of the peak marks 1, 2, 3, ... in the record of FIG. 4, and from knowing the natural period 2Δt of the reed; and that the excursion envelope 50, 51 determines the curve of acceleration vs. time, or shock signature 53. The necessary time information has been obtained from the natural period of the reed, without any need for physically moving the record medium with respect to the stylus, as by means of a motor.

Referring back to FIGS. 2 – 4, it will also be apparent that such records may be obtained by this invention from any driving force 23 (FIG. 2) from any source, such as a magnetic field or a blast of gas, provided that the source of this force has a mechanical impedance such that it does not excessively load the resonant mechanical system or reed 10.

Figure 6:
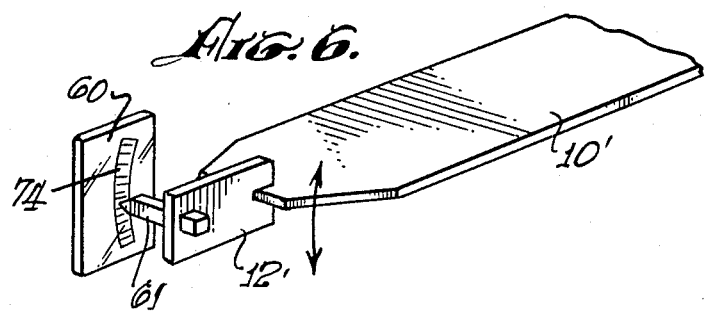
FIG. 6 is a partial diagrammatic perspective of a reed and recording means of a modification of the invention, using magnetic recording.
Figure 7:
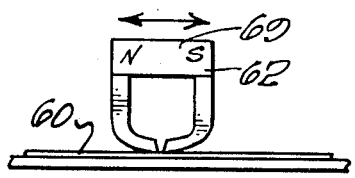
FIG. 7 is a diagram of an alternative type of magnetic head.

Referring now to the modification of the invention shown in FIGS. 6–9, the novel principles described above may be embodied in a system which uses magnetic recording instead of mechanical embossing or the like. FIG. 6 is a partial, enlarged, perspective view of a reed according to this form of the invention, showing means to record its motion magnetically. The reed is shown at 10', and may be similar to the reed 10 in FIG. 2, and the reeds 10, 10a ... 10g in FIG. 1. It may carry a resilient carrier 12' at its end portion, which may be similar to the stylus carrier 12 in FIG. 2. In place of a stylus at the end portion of carrier 12, however, there is provided a magnetic element 61. This may be in the form of a small permanent bar magnet with a pointed or chisel-shaped tip, as shown. Alternatively, it may be of the kind shown at 62 in FIG. 7, a small magnetic head shaped for conventional longitudinal magnetization of the medium, with a permanent magnet 69. Both the magnet 61, FIG. 6, and the head 62, FIG. 7, are disposed adjacent or touching a magnetic record surface 60.

Magnetic record surface 60 may be of any suitable type, such as a conventional coating of particles of magnetic oxide in a binder, applied to a non-magnetic substrate, not shown in FIG. 6. The substrate may be a surface 15 on hub 16, FIGS. 1 and 2. Alternatively, a piece of magnetic recording tape may be cemented to surfaces 15 as in FIG. 2.

A known method of producing a retrievable record on a magnetic medium is to pre-record an unmodulated carrier wave of relatively high frequency on the medium, and then employ a movable permanent magnet marking element or head to erase, or to partially erase, this carrier. The mechanical displacements of the permanent magnet device then leave a retrievable record on the medium in the form of absences or reductions in the pre-recorded carrier. It is also known that such a movable permanent magnet marking element may have its field strength chosen so that it only partially erases the carrier on a single pass across the medium; subsequent passes then reduce the carrier wave magnetization to successively greater degrees.

Accordingly, the invention may be embodied in a pre-recorded carrier wave system as shown in FIGS. 6–9. In FIG. 6, the carrier wave may be pre-recorded (by obvious means not shown) to provide a magnetic track indicated at 74 on record medium 60. When the reed 10' executes a decaying oscillatory motion, the small permanent magnet 61 moves back and forth along the track 74, producing successively greater erasure with each pass. The resulting record can be retrieved in various ways. Magnetic records can be made visible, as is known, by applying thereto a suspension of fine magnetic particles in a volatile liquid. The ends or peaks of each oscillatory pass of the magnet 61 can then be made visible (under optical magnification), by particle patterns representing step-like changes in the intensity of magnetization.

In the mechanical record of FIG. 4, the portion of the record between points 1 and 3, and between points 2 and 4, has been passed over twice; the portion between points 3–5 and 4–6 has been passed over four times, and so on. Thus the excursion peaks such as 1–9 in FIG. 4 can be located. In a magnetic record, the same process applies, wherever the excursion peaks of the marking device can be located. The shock signature can then be derived and plotted, in the same way as described in connection with FIG. 5.

Figure 8:
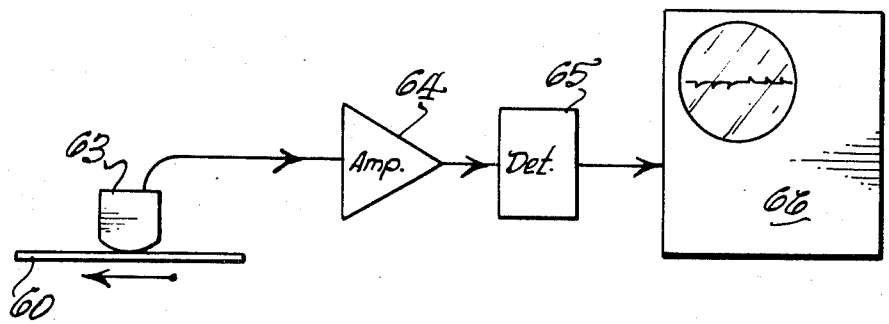
FIG. 8 is a diagram of a magnetic playback apparatus.
Figure 9:
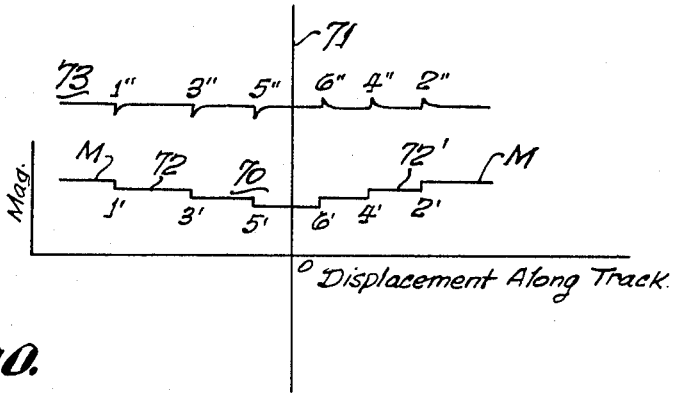
FIG. 9 is a graph showing two types of display record from the playback apparatus of FIG. 8.

Another method of data retrieval is indicated in FIGS. 8 and 9. Instead of using magnetic particles (dusting), the record medium 60 may be played back by moving it under a conventional magnetic playback head 63, FIG. 8. The output of playback head 63 may be fed into an amplifier 64 and a detector 65, thence to a storage oscilloscope 66 or other suitable display instrument. Referring now to FIG. 9, the intensities of demagnetization (or magnetization) along the record track 74 (FIG. 6) may be illustrated graphically at 70. On line 70, the first excursion of the magnet or head 61 or 62 was between points 1' and 2'. The original magnetic state of the track is indicated as level M, M. Between points 1' and 3', and 2' and 4', the state is changed by a certain increment as at 72, 72'. Between points 3' and 5', and 4' and 6', it is changed by a further increment — since the magnet 61 or 62 has made two more passes over this portion of the track — and so on. Thus the excursion peaks 1'–6' can be displayed on the instrument 66. It is assumed that the output of detector 65 is filtered, so that the frequency of the pre-recorded wave itself does not appear in the display.

In certain systems it is advantageous to use a flat, i.e., non-integrating, amplifier at 64, so that the signal fed to display 66 is in the same differentiated form supplied by the playback head 63. The display then is in the form shown at 73 in FIG. 9. The excursion peaks 1'–6' now appear as their time derivatives, the pips 1''–6''. When the reversal of the reed displacement is in one sense, the pips are upward; in the opposite sense, downward. Thus the rest position of the magnet device 61 or 62, i.e., zero line 71 (FIG. 9), may be easily identified, being between the last upward pip, as 6'', and the last downward pip, as 5''. Such pips provide clear indications of the locations of the excursion peaks, and this information, together with the natural frequency of the reed, may be used to obtain the shock signature or acceleration vs. time curve, in the same manner as described in connection with FIGS. 4 and 5.

Figure 10:
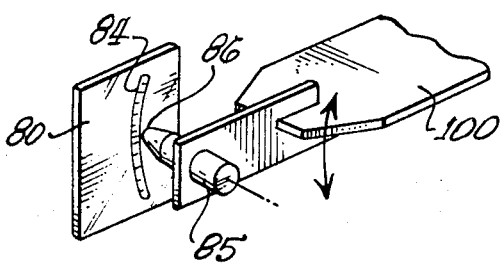
FIG. 10 is a partial diagrammatic perspective view of a further modification of the invention, using photographic recording.

FIG. 10 shows a further modification of the invention, using photographic recording. Reed 100, which may be similar to reeds 10 and 10' of FIGS. 2 and 6, carries a source 85, from whose tip portion 86 light or other radiation is emitted, in a fine beam of very small cross-sectional area. The record medium 80, adjacent tip 86, is a piece of photographic film or the like. Source 85 may emit any kind of radiation that will suitably effect a photographic medium. Since the optical density of exposed film is approximately proportional to the logarithm of the exposure, and the exposure is proportional to the velocity with which the source 85 is moving with respect to the film 80, it is evident that an exposed track 84 will be produced having density graduations which show the excursion peaks of the decaying oscillatory motion of the reed 100.

In this specification, the term, "resonant mass-spring system" means any mechanically resonant element or structure having mass and elasticity which can be used to provide a substantially known deflection in response to an applied force. The term "marking element" is used to mean any element whose presence leaves a detectable mark or record on the recording surface, e.g., a source of light or radiation on a recording surface of photographically sensitized material, or a magnetic head on a surface of magnetic recording material.

The invention is not limited to the specific modes of recording here described, but may include any method of recording within the scope of the claims.

I claim:

1. A method for determining the waveform and magnitude of a transient mechanical force, comprising the following steps:
    a. applying said force to a resonant mass-spring system of known natural period to produce a displacement of a point on said system having a transient component and a decaying oscillatory component,
    b. recording said displacement along substantially a single line,
    c. detecting the peak excursions of said oscillatory component at points along said line,
    d. plotting the displacements of said peaks at intervals along a time axis determined by said natural period, and
    e. plotting the mean displacements between said peaks to provide points of transient displacement along said time axis to recover said waveform.

2. A method as in claim 1,
    said force being the inertial reaction of the mass of said system to an applied acceleration.

3. The method of claim 1, wherein,
    said recording step includes embossing with a rounded stylus on a relatively soft recording surface.

4. A recorder for a transient mechanical force, comprising:
    a plurality of resonant mass-spring systems responsive to said force and each having a known natural frequency,
    a portion of each said system being adapted to execute a displacement having a transient component substantially proportional to said force and a decaying oscillatory component at its natural frequency,
    said displacement being along a known line;
    a marking stylus having a hard rounded tip connected to each said portion; and
    a softer recording surface in marking relation with each said stylus to receive an embossed mark along said line with substantial plastic deformation and flow of said surface, to make detectable the individual peak excursions in each half-cycle of said oscillatory component,
    said mass-spring systems being disposed generally tangentially around a central hub and said recording surfaces being on said hub and separated by relieved portions; and
    means for rotating said hub to bring one of said relieved portions opposite each said stylus to permit installation and removal of said hub,
    said transient component with its time-scale being recoverable from knowledge of the locations of said peak excursions and of said natural frequencies.

* * * * *